No. 650,118. Patented May 22, 1900.
T. F. TIERNEY.
CHURN.
(Application filed July 29, 1899.)
(No Model.) 2 Sheets—Sheet 2.
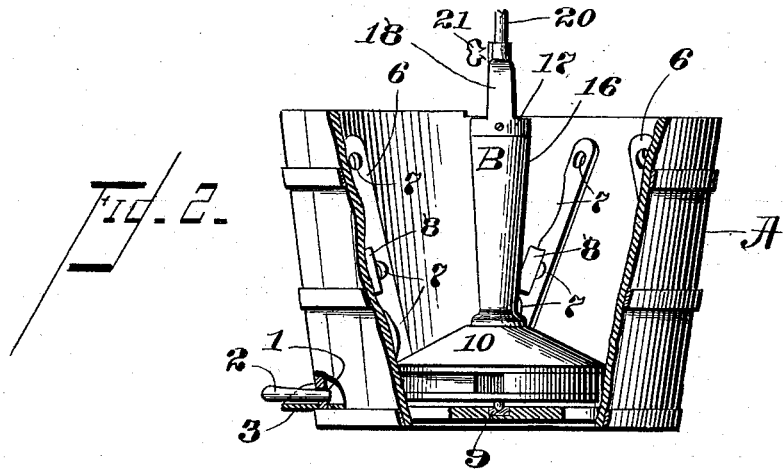
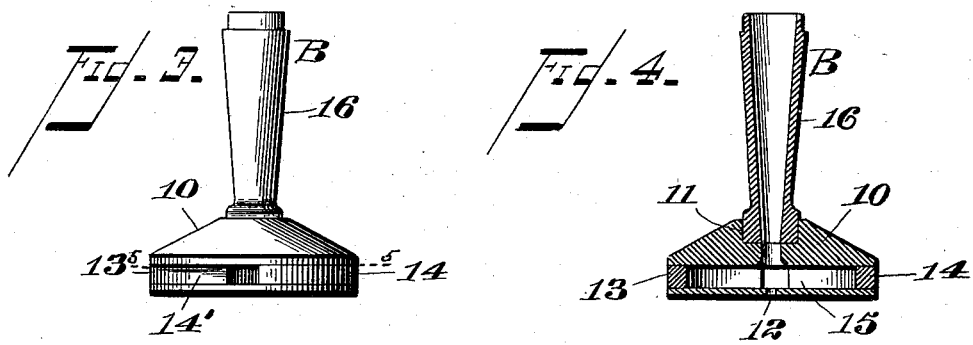
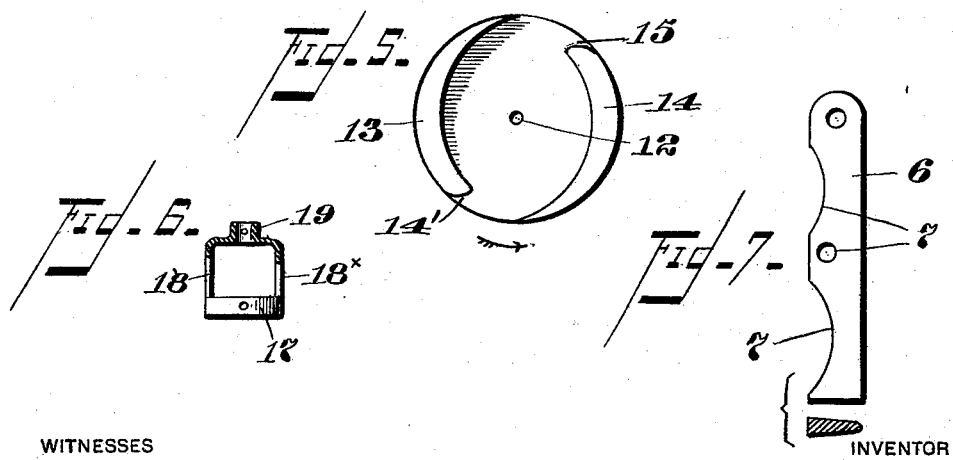
WITNESSES
INVENTOR
Thomas F. Tierney
THE NORRIS PETERS CO., PHOTO-LITHO., WASHINGTON, D. C.

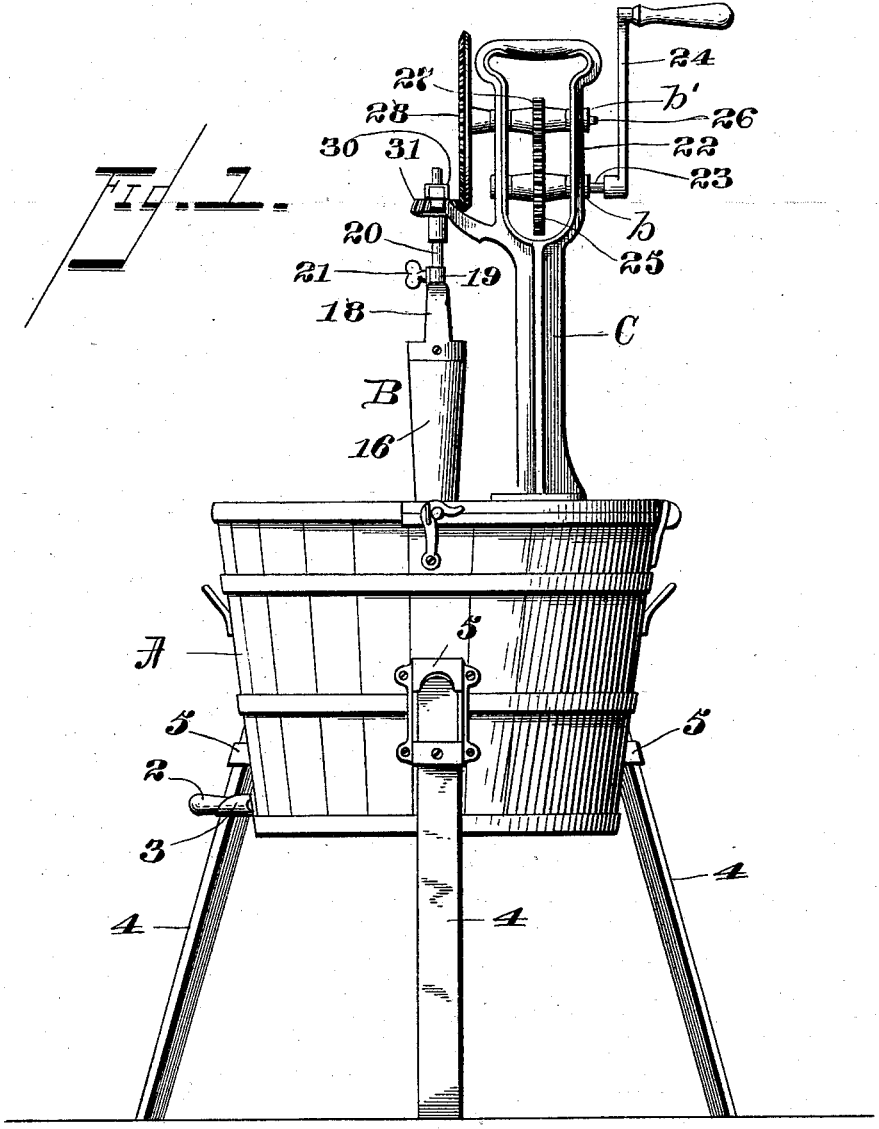

UNITED STATES PATENT OFFICE.

THOMAS F. TIERNEY, OF ALTOONA, PENNSYLVANIA.

CHURN.

SPECIFICATION forming part of Letters Patent No. 650,118, dated May 22, 1900.

Application filed July 29, 1899. Serial No. 725,522. (No model.)

*To all whom it may concern:*

Be it known that I, THOMAS F. TIERNEY, a citizen of the United States of America, residing in Altoona, in the county of Blair, in the State of Pennsylvania, have invented a new and useful Rotary Churn, of which the following is a specification.

My invention has relation to improvements in rotary churns wherein a column or current of air is utilized to promote, enhance, and speedily accomplish the separation of the cream and the production of butter.

The invention will be fully described hereinafter and the novelty thereof particularly pointed out in the claim.

I accomplish the purpose and object of my invention by the means or mechanism illustrated in the accompanying drawings, in which—

Figure 1 is a view in elevation of the complete churn as it appears ready for operation. Fig. 2 is a similar view with the shell of the churn-body broken away to show the arrangement of the interior break strips or panels and the dasher, the bottom of the churn being partly in section to show the bearing for the end of the vertical shaft and the mechanism for rotating the dasher being removed. Fig. 3 is an enlarged detail view of the hollow dasher and stem. Fig. 4 is a vertical transverse central sectional view of the dasher and stem. Fig. 5 is a view in horizontal section through the dasher, taken on the line 5 5 of Fig. 3. Fig. 6 is a detail of the stirrup which is secured to the top of the hollow stem and which has the vertical shaft detachably fixed therein. Fig. 7 is a detail side view of one of the break strips or panels.

Referring to the drawings, wherein the respective parts and elements are designated by reference letters and numerals, A designates the body or barrel of the churn, preferably made in tub shape and tapering from top to bottom, as indicated, and composed of any suitable material. I have shown it as being made of staves maintained and secured in proper shape by hoops arranged thereon in the usual manner and having a substantial bottom of wood. Adjacent to or on a level with the bottom of the churn-body is an opening 1, closed by a plug 2, and provided with a spout 3, secured to the surface of the body and with which the opening communicates to discharge the contents of the churn, as desired or required. The churn-body is supported on legs 4, having chamfered upper ends, so that they incline outward, as shown, and having their upper ends detachably secured in brackets or sleeves 5 of any suitable construction.

In the interior of the churn-body are secured break-strips 6, arranged at equal determined distances apart and inclined in vertical direction to the vertical axis of the churn and having a number of perforations 7, through which the contents of the churn are forced during agitation, the strips being secured in position by cleats or blocks 8 8. These break-strips are preferably tapered in cross-section from the back, resting against the surface of the churn-body to their outer edge, so that they have a tendency to deflect the contents toward the center of the churn, and their inclined direction serves to direct the contents downward in the body of the churn, thereby producing a downward agitation by the contact instead of splashing the contents in upward direction, and thus by the force of the downward movement giving additional agitation to the other portion of the contents adjacent to and in contact with the exterior of the dasher. These break-strips are shown in detail in Fig. 7 of the drawings. In the bottom of the churn is formed a bearing 9, wherein the lower end of the vertical shaft has its bearing and seat. (See Fig. 2.)

B designates the dasher, consisting of a hollow body circular in contour and having a conical top part 10, formed with a central seat or socket in its apex, as at 11, wherein the hollow stem is seated and secured by any proper means, and in the center of the socket 11 is an opening communicating with the interior of the dasher, as indicated in Fig. 4 of the drawings. The bottom of the dasher has a central opening 12, through which the lower end portion of the vertical shaft passes to provide for its engagement or bearing in the bottom of the churn. The top and bottom of the dasher are secured together by crescent-shaped segments 13 14, arranged on opposite sides of the chamber in the dasher and having their outer edges concentric with the perimeter of the dasher for the greater portion of their lengths and at opposite points, as at 14' 15, turned sharply inward and eccentric to the circumferential edge of the dasher, substantially as seen in Fig. 5 of the drawings, whereby radial passages or openings are formed between the respective approaching ends of the segments and an enlarged central chamber in the interior of the body of the dasher. A dasher of this construction having the conical top, which, being rotated in the direction of the arrow, (indicated in Fig. 5,) promotes the churning process by forcing the air down the hollow stem into the chamber of the dasher, and from thence into the cream through the radial openings and up over the conical top in an agitative wave motion, the currents of cream escaping from the incline of the top back into the body of the cream for renewed contact with the air. In the seat in the apex of the dasher is detachably secured the vertical hollow stem 16, opening at its base into the chamber of the dasher and formed at its top with a shoulder above which the stem is contracted to provide means for the reception and retention of a stirrup-band 17. This stirrup-band is formed with vertical arms 18 18×, arranged radially opposite on the band and directed inward toward the center, as shown, and connected to and supporting a central sleeve 19, through which the vertical shaft 20 is projected, as shown in the drawings. A set-screw 21, let through the sleeve 20 and bearing with its end against the shaft, serves to hold the stem in the position to the shaft as desired. The bore or tube of the vertical stem 16 is made flaring from bottom to top, whereby the volume of air entering the mouth is forced down the stem and delivered to the dasher with accelerated impetus.

To operate the dasher and stem, I have devised the following described mechanism: C designates a standard having an enlarged base adapted to be secured to the upper surface of the cover of the churn and extending to such a height as may be required or desired to meet the exigencies to which it may be subjected. At the upper end of the standard is formed a vertical frame 22, composed of vertically-parallel side pieces, as shown, connected at the top by a cross-piece. In the side pieces of the frame are formed upper and lower bearings, the lower bearings being designated by $b$ and the upper by $b'$, arranged parallel in longitudinal relation with each other, as shown. In the lower bearings is journaled a shaft 23, having one end extended, as shown, to receive a crank 24, by which the shaft may be rotated. On the lower shaft is fixedly mounted a pinion 25. In the upper bearings is journaled a shaft 26, having mounted thereon a pinion 27, in mesh with the pinion 25. On the extended end of the shaft 26 is mounted and fixedly secured a larger pinion 28.

20 designates the vertical shaft, which is projected through and detachably secured in the sleeve 19 of the stirrup on the top of the hollow stem of the dasher and having its lower end suitably seated in the bearing 9 in the bottom of the churn. The top end of the vertical shaft 20 is journaled in a bearing 30, formed in the end of an arm projected from the standard C, and on the upper end of the vertical shaft is secured a bevel-pinion 31, in mesh with the gear or larger pinion 28, substantially as shown. It will thus be perceived that by turning the crank the associated gearing and mechanism results in imparting to the dasher a rapid revolution, and consequently a violent agitation of the contents of the churn. The vertical shaft 20 is made of smaller diameter than the bore of the stem of the dasher, so that an annular space is formed between the interior of the stem and the surface of the shaft, whereby the air is free to enter the stem and be carried down into contact with the contents of the churn.

It will be observed that the cover of the churn-body is of peculiar make or construction, being in two sections or parts which are substantial duplicates in contour and aline on the surface. The half-section of the lid supporting the stand and gears fits with its under surface upon a groove or slot specially made in the body to receive it, while the under surface fits the top of the body, as shown, holding in place the center shaft of the churn. The other half-section of the cover fits to the inside and top of the churn-body and is removable at will.

The process of aeration of the cream by means of and through the center or vertical hollow stem of the rotary dasher hastens the process of liberating the butter and also of thoroughly removing any and all impurities or dissipating the odors it may contain, resulting in a product of pure and wholesome flavor and its keeping qualities largely increased.

The opening in the center of the cover permits of the escape of any and all foul odors that are driven out by the aerating process continually applied down through the hollow stem of the dasher. This opening also permits of the raising and lowering of the stem and dasher at will, so that the dasher may be placed at the desired position in the contents of the churn.

I am aware that rotary churns have been made having hollow dashers with vertical stems and curved or segmental pieces in the body of the dasher, as shown in patents to Munday, No. 489,872, dated January 10, 1893, and Moser, No. 599,723, dated March 1, 1898, which constructions I disclaim, my improvements being laid to the particular constructions of the dasher with the crescent-shaped segments and the vertical stem with downward-tapering bore, as particularly set forth in the claim.

What I claim is—

In a rotary churn, a dasher consisting of a circular hollow body comprising a bottom, crescent-shaped segments 13, 14 arranged opposite to each other with their outer faces concentric with the perimeter of the dasher for the greater portion of their length and their opposite end portions 14', 15, turned sharply inward and eccentric to the edge face of the dasher, there being a radial passageway between the adjacent ends, and the conical top formed with a central socket and an opening leading therefrom into the interior of the dasher, and a vertical hollow stem, the bore of which tapers from top to bottom.

THOMAS F. TIERNEY.

Witnesses:
OLIVER SPEMELLER,
K. E. CREIGHTON.